UNITED STATES PATENT OFFICE.

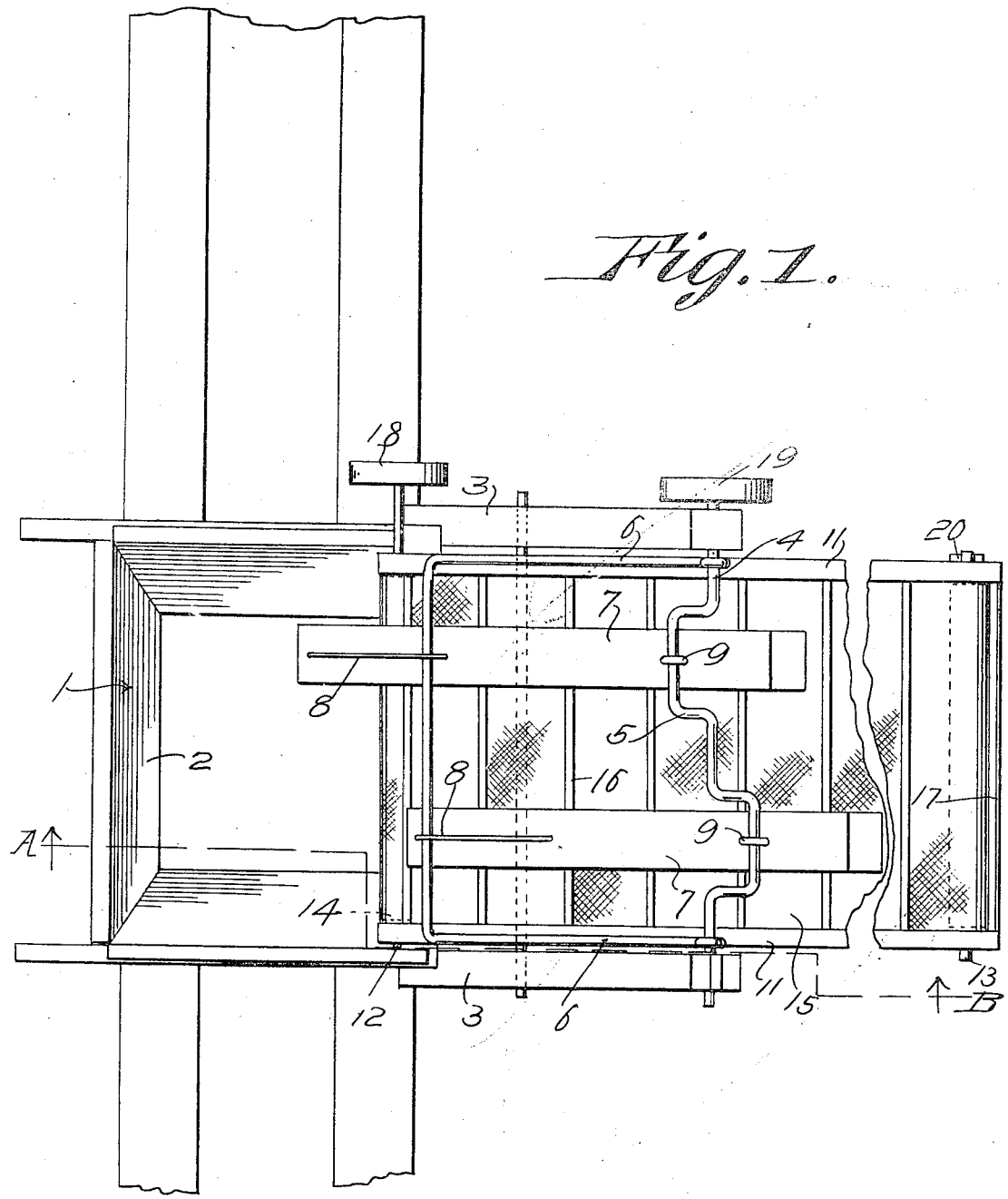

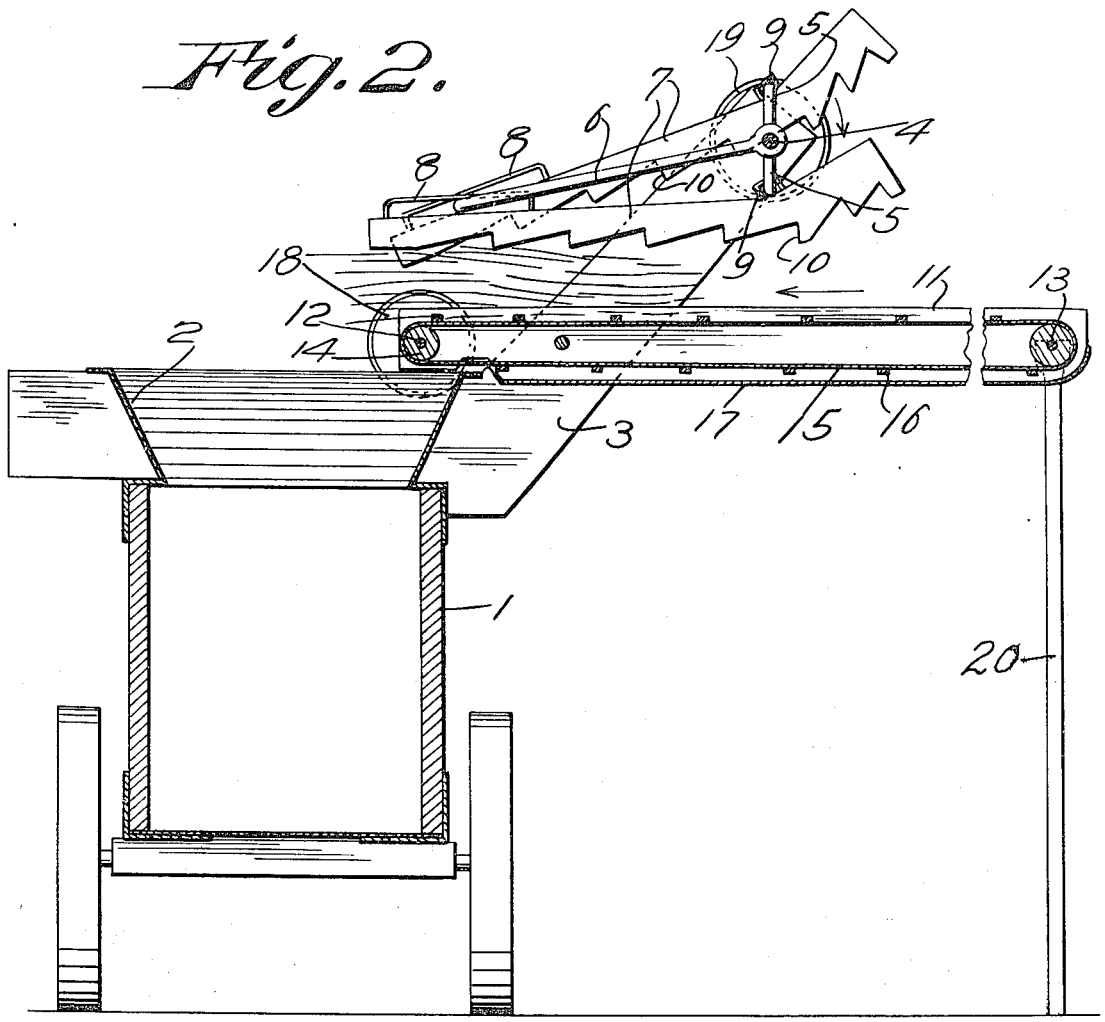
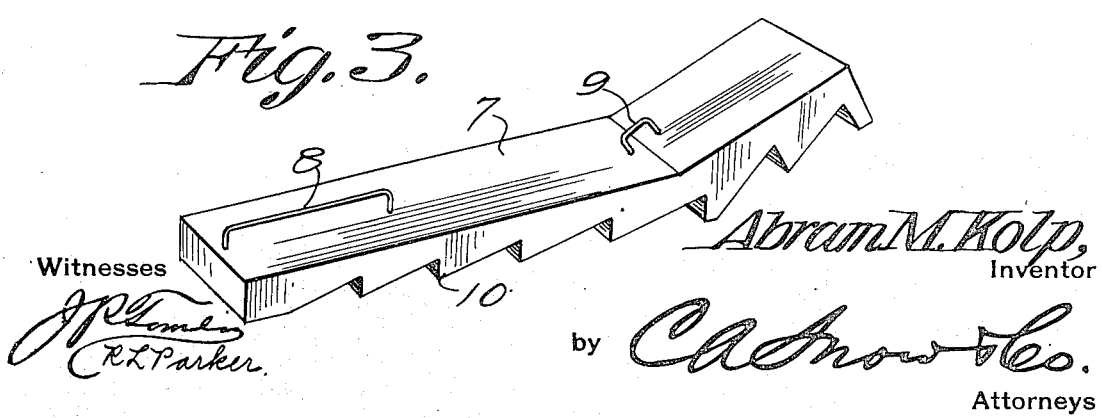

ABRAM M. KOLP, OF SALUNGA, PENNSYLVANIA.

FEEDER FOR BALING-MACHINES.

1,195,479.   Specification of Letters Patent.   Patented Aug. 22, 1916.

Application filed March 14, 1916.   Serial No. 84,120.

*To all whom it may concern:*

Be it known that I, ABRAM M. KOLP, a citizen of the United States, residing at Salunga, in the county of Lancaster and State of Pennsylvania, have invented a new and useful Feeder for Baling-Machines, of which the following is a specification.

This invention relates to feeding mechanism particularly designed for use in connection with baling machines, one of the objects of the invention being to combine with an endless conveyer, combined oscillating and reciprocating means which forces the material to be baled into the baling chamber, the said feeding means being adjustable to different thicknesses of material so that it will always operate efficiently irrespective of the amount of material being supplied.

A further object is to provide feeding mechanism which is simple and durable in construction and which will not readily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a portion of a baling press and showing the present improvements combined therewith. Fig. 2 is a vertical longitudinal section through the feeding mechanism, said section being taken transversely of the baling press. Fig. 3 is a perspective view of one of the feeding bars.

Referring to the figures by characters of reference 1 designates a press box having the usual feed hopper 2 and extending laterally and upwardly from the press box at the sides of the hopper 2 are arms 3 in the upper or outer end portions of which is journaled a shaft 4 having oppositely disposed cranks 5. Pivotally connected to this shaft is a guide bail 6 under which extends feed bars 7 each of which has a guide strap 8 connected thereto and extending longitudinally thereabove, the bail being extended between the bars and the guide straps. The bars are extended under the respective cranks and are connected to them by eyes 9 or the like. Those portions of the bars remote from the hopper 2 are preferably extended upwardly at obtuse angles and formed upon the lower faces of the bars from one end to the other thereof are angular projections or teeth 10 so shaped that when the bars are moved in one direction the teeth will thrust against any material engaged thereby whereas, when the bar is moved in the opposite direction, the teeth will slip over the material.

Arranged between the arms 3 is a frame 11 and journaled within the end portions of the frame are transverse shafts 12 and 13 respectively carrying rollers 14 on which is mounted an endless belt 15 preferably provided with transverse cleats 16. A board 17 is extended under the conveyer belt and is secured to the sides of the frame. A pulley 18 may be attached to the shaft 12 and another pulley 19 may be attached to the shaft 4. These two pulleys are adapted to be driven by any suitable mechanism provided for that purpose so that the conveying apron and the shaft 4 will operate in the directions indicated by the arrows in Fig. 2.

Supports such as pivoted legs 20 may be connected to the end portions of the shaft 13 so as to hold up the outer end of the frame 11 while the feeding mechanism is in use, thus to prevent the machine from tilting over under the weight of the load upon the apron 15.

In using the apparatus the material to be supplied to the press box is placed on the moving apron 15 and is carried thereby under the bars 7. At the same time shaft 4 is rotated in the direction indicated by the arrow in Fig. 2 and this will cause the bars to both reciprocate and oscillate, those ends of the bars nearest the hopper 2 resting at all times upon the material on the apron, while the opposite ends of the bars move downwardly onto the material so as to force the projections 10 thereinto and then shift longitudinally in the general direction of travel of the upper flight of the belt. Thus the material on the belt is gripped and positively fed toward the hopper, those ends of the bars nearest the hopper and which project beyond the discharge end of the apron, exerting a downward thrust upon the material so as to force it into the hopper when it leaves the belt. As the said ends of the bars are guided upon the bail 6, it will be seen that they are free to bear at all times upon the material.

What is claimed is:—

1. Feeding mechanism for baling presses and the like, including an endless conveyer, a shaft mounted for rotation thereabove and having a crank, a bail pivotally mounted on the shaft and extending over the conveyer, a feeding bar slidably connected at one end to the bail and pivotally connected adjacent its other end to the crank, one end of the bar being normally held by gravity upon the material supported by the conveyer, and means for rotating the shaft to set up a combined oscillation and reciprocation of the bar.

2. Feeding mechanism for baling presses and the like, including an endless conveyer, a shaft mounted for rotation thereabove and having a crank, a bail pivotally mounted on the shaft and extending over the conveyer, a feeding bar slidably connected at one end to the bail and pivotally connected adjacent its other end to the crank, one end of the bar being normally held by gravity upon the material supported by the conveyer, and means for rotating the shaft to set up a combined oscillation and reciprocation of the bar, said bar being toothed, the teeth being shaped to force material when moved in one direction and to drag over the material when moved in the other direction.

3. Feeding mechanism for baling presses and the like, including an endless conveyer, a crank shaft mounted for rotation thereabove, a bail pivotally connected to the crank shaft, said bail being extended toward the delivery end of the conveyer, bars pivotally connected to the respective cranks on the shaft and slidably engaging the bail, each of said bars having one end portion inclined upwardly relative to the remaining portion, there being transverse teeth upon the bottom of the bar, said teeth being extended from one end to the other of the bar, and means for rotating the shaft to simultaneously slide and oscillate each of the bars thereby to force the teeth of the bars successively into the material on the conveyer and to press the engaged material in the direction of movement of the upper flight of the conveyer.

4. Feeding mechanism for baling presses and the like, including an endless conveyer, a crank shaft mounted for rotation thereabove, a bail pivotally connected to the crank shaft, said bail being extended toward the delivery end of the conveyer, bars pivotally connected to the respective cranks on the shaft and slidably engaging the bail, each of said bars having one end portion inclined upwardly relative to the remaining portion, there being transverse teeth upon the bottom of the bar, said teeth being extended from one end to the other of the bar, and means for rotating the shaft to simultaneously slide and oscillate each of the bars thereby to force the teeth of the bars successively into the material on the conveyer and to press the engaged material in the direction of movement of the upper flight of the conveyer, said bars being movable at one end beyond the delivery end of the conveyer thereby to direct delivered material downwardly from the conveyer.

5. The combination with a press box and a hopper extending upwardly therefrom, of an endless conveyer for delivering material to the hopper, a crank shaft extending transversely above the conveyer, a bail pivotally connected to the shaft and extending toward the discharge end of the conveyer, bars slidably mounted at one end upon the bail and pivotally mounted adjacent their other end upon the respective cranks, each of said bars having that end portion nearest the shaft inclined upwardly relative to the remaining portion, there being teeth upon the bottom faces of the bars and extending from one end to the other of the bars, and means for rotating the crank shaft to move the bars successively downwardly to engage the material on the conveyer and to thrust the material in the direction of movement of the upper flight of the conveyer, the slidably mounted ends of the bars bearing normally by gravity upon the material and said ends being provided to successively project beyond and downwardly relative to the discharge end of the conveyer.

In testimony that I claim the foregoing as my own, I have hereto affixed my signature in the presence of two witnesses.

ABRAM M. KOLP.

Witnesses:
SAMUEL KOLP,
J. N. SUMMY.